UNITED STATES PATENT OFFICE.

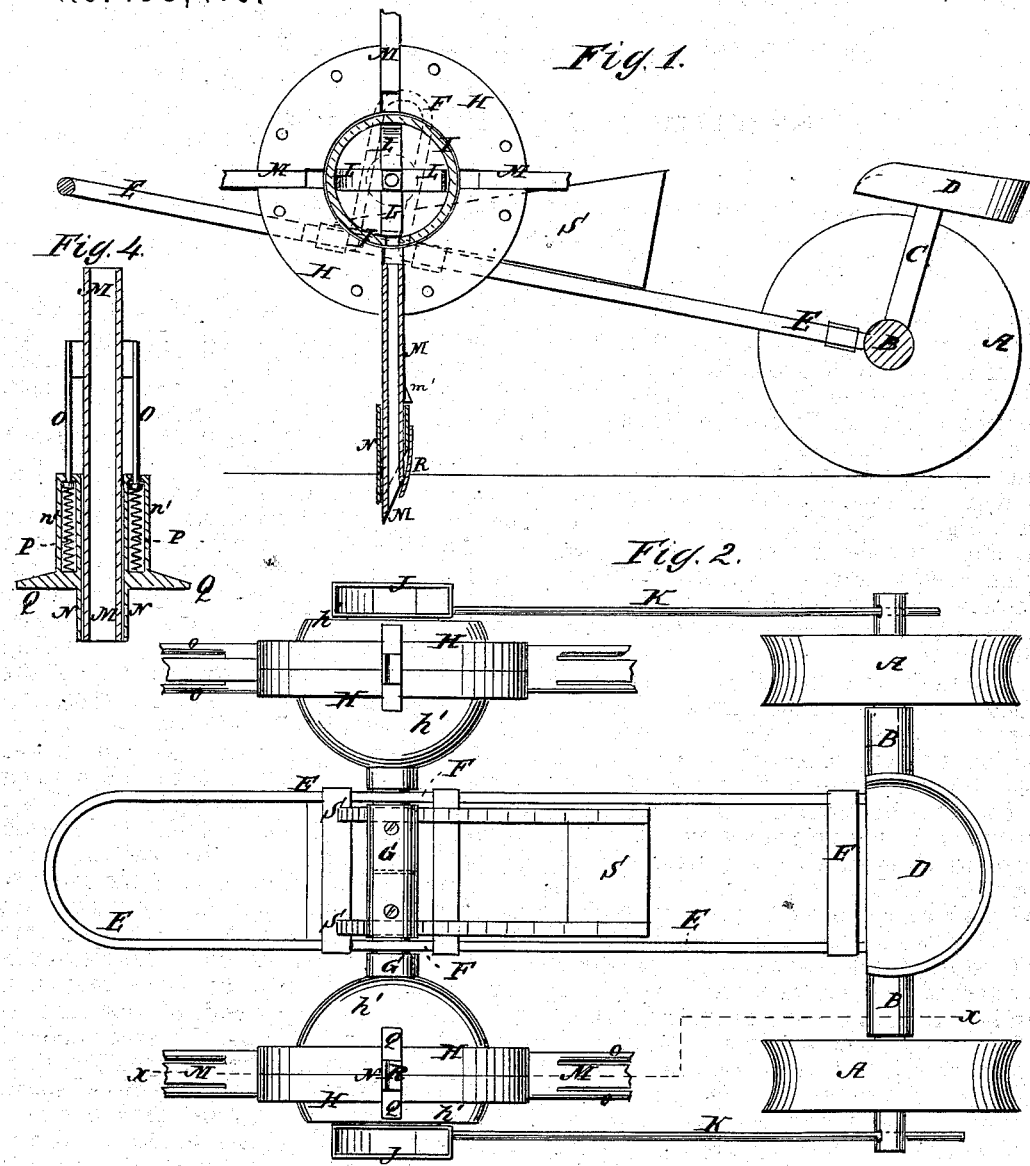

JENS ELVERUD, OF RED WING, MINNESOTA.

IMPROVEMENT IN CORN-PLANTERS.

Specification forming part of Letters Patent No. 158,410, dated January 5, 1875; application filed October 24, 1874.

*To all whom it may concern:*

Be it known that I, JENS ELVERUD, of Red Wing, in the county of Goodhue and State of Minnesota, have invented a new and useful Improvement in Corn-Planter, of which the following is a specification:

Figure 1 is a vertical longitudinal section of my improved machine, taken through the line $x\ x$, Fig. 2. Fig. 2 is a top view of the same. Fig. 3 is a detail section of one of the dropping-wheels. Fig. 4 is a detail longitudinal section of one of the dropping-tubes.

Similar letters of reference indicate corresponding parts.

The invention will first be fully described and then pointed out in the claims.

A are two wheels, the rims of which are made wide, and are concaved to adapt them to press the soil down upon the seeds, and thus complete the covering. The wheels A revolve upon the journals of the axle B, to the center of which is attached the standard C of the driver's seat D. To the axle B is also attached the rear end of the frame E, to the forward end of which the draft is applied. To the side edges of the forward part of the frame E are attached, or upon them are formed, long upwardly-projecting loops or slotted standards F, through which the axle G passes, and within which said axle revolves. To the ends of the axle G are rigidly attached the wheels H, the middle parts of which are enlarged, and are chambered to form a cavity, $h'$, to receive the reservoir I, which is fitted into the chamber $h'$. The reservoir I is made with a neck upon its outer side, which passes out through an opening in the middle of the outer part of the wheels H, and to which is attached a hopper, J, through which the seed is introduced into the reservoir I. The reservoir I and hopper J are held stationary, while the wheels H revolve, by a rod, K, which passes through the projecting neck of the reservoir I, through the lower part of the hopper J, and the rear end of which passes through a staple or eyebolt attached to or through a hole formed in the end of the axle B. In the wheels H are formed, at equal distances from each other, four or more radial holes, according to the size of said wheels, and leading in from the rims of said wheels to the chamber $h'$. In the bottom of the reservoir I is formed a hole of such a size as to contain exactly the amount of seed required for a hill, and from which the seed drops into the holes of the wheel H as each hole of said wheel comes beneath the hole of the reservoir I. In the reservoir I are placed four or more arms or blades, L, according to the number of radial holes in the wheels H. The arms L are so formed as to fit upon the inner surface of the reservoir I, are made of such a length as to reach beyond the dropping-hole of said reservoir, and are rigidly connected with the wheel H at its axis by a bolt passing through the reservoir I, as shown in Fig. 3. By this construction, as each hole of the wheel H comes beneath the hole in the reservoir I and receives the seed, the corresponding arm L comes above said hole and serves as a cut-off to prevent any more seed passing out than the amount contained in said hole. In each radial hole of the wheels H is inserted a tube, M, through which the seed passes to the ground. The lower ends of the tubes M are beveled off, and upon said lower ends are placed sleeves N, the lower ends of which are correspondingly beveled off. The sleeves N slide up and down upon the tube M and upon guide-rods O, the upper ends of which are attached to said tube M, and the lower ends of which enter sockets $n'$ formed upon the sides of the sleeve N, and in which are placed spiral springs P, which rest against the lower ends of the rods O and thus push the sleeve N downward. The upward movement of the sleeve N upon the tube M is limited by a stop, $m'$, formed upon or attached to said tube. To the opposite side edges of the lower part of the sleeve N are attached, or upon them are formed, shoulders or projections Q, which strike against the ground and thus push the sleeve N up upon the tube M. To the lower part of the sleeve N is attached a spring-plate, R, which closes the inclined open end of the sleeve N and prevents the escape of the seed until the sleeve N has been pushed up upon the tube M by the pressure of the ground.

By this construction the wheels H are revolved by the tubes M, which strike the ground and serve as fulcrum-points around which the wheels H move, the axle G moving up and down in the loops or slotted standards F, the sleeve N of each tube M being pushed up to discharge the seed into the soil as the weight of the wheels H and axle G are thrown upon said tube M.

Upon the frame E, between the loops or slotted standards F and below the axle G, is placed a wedge-shaped frame, S, which may be pushed forward by the driver with his feet, to raise the axle G and dropping-wheels H, so that the tubes M will not touch the ground, for convenience in turning and in passing from place to place.

Having thus described my invention, I claim as new and desire to secure by Letters Patent—

1. The frame E, attached rigidly to rear axle B and connected with front axle G of the seeding-wheels by slotted standard F, all combined and operating as and for the purpose described.

2. The combination, with axle G, of the seed-wheels and frame E, having slotted standards F F, of the wedge S, as and for the purpose described.

JENS ELVERUD.

Witnesses:
O. O. HEGNA,
JOHAN A. BOLSTAD.